Feb. 10, 1931.  H. J. ZIEMAN  1,792,135
ADVERTISING DISPLAY DEVICE
Filed Aug. 20, 1928  2 Sheets-Sheet 1
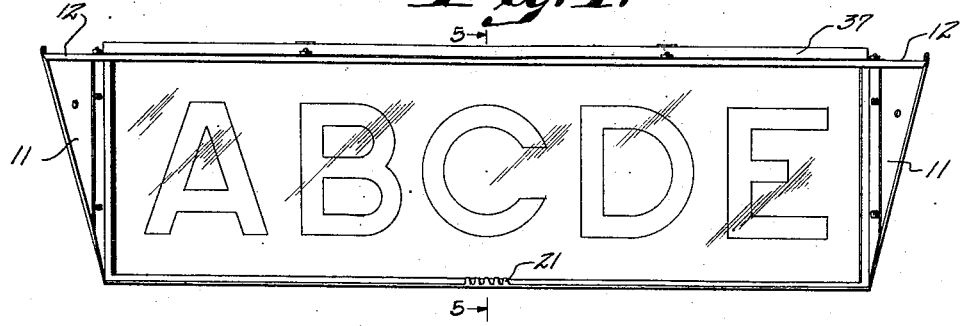
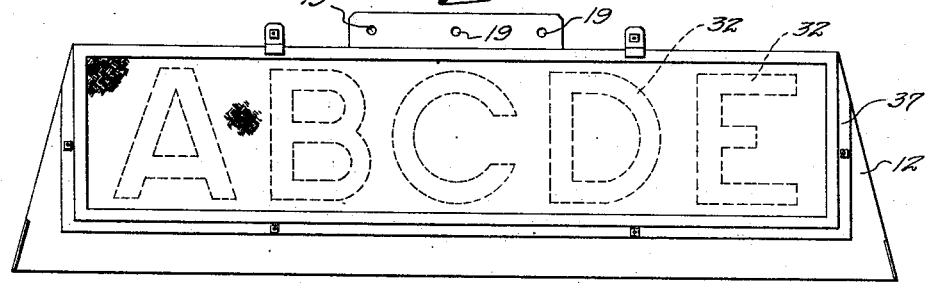
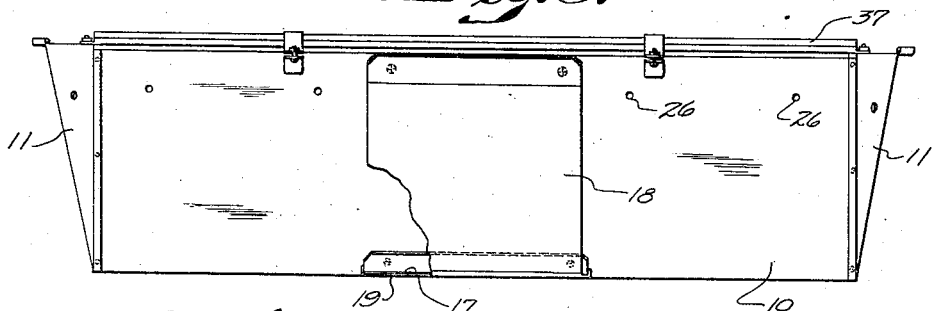
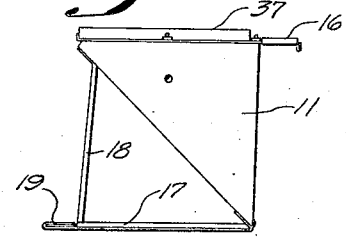
INVENTOR.
Harry J. Zieman
BY
Erwin, Wheeler & Woolard
ATTORNEYS Feb. 10, 1931. H. J. ZIEMAN 1,792,135
ADVERTISING DISPLAY DEVICE
Filed Aug. 20, 1928 2 Sheets-Sheet 2
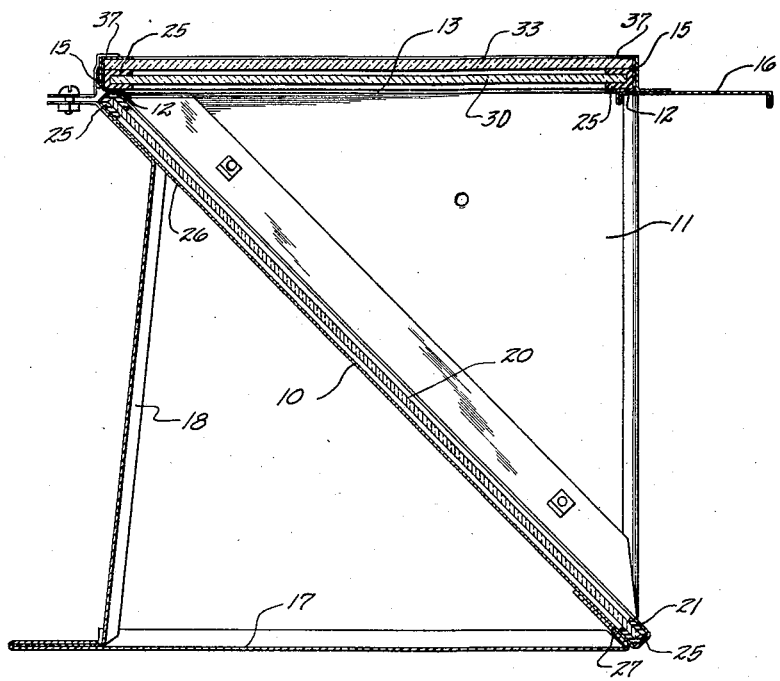
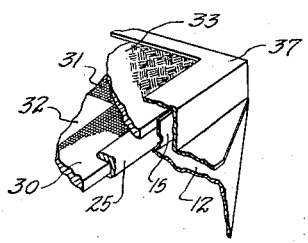
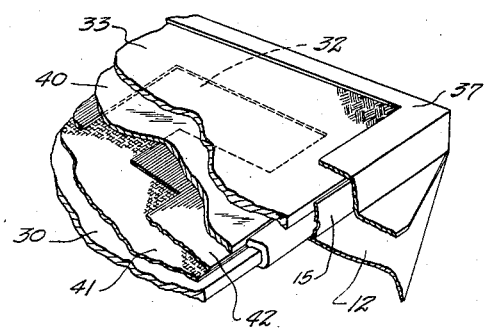
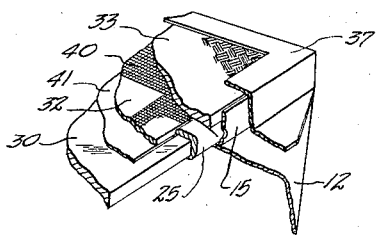
INVENTOR.
Harry J. Zieman
BY
Erwin, Wheeler & Woolard
ATTORNEYS Patented Feb. 10, 1931

1,792,135

UNITED STATES PATENT OFFICE

HARRY J. ZIEMAN, OF MILWAUKEE, WISCONSIN

ADVERTISING DISPLAY DEVICE

Application filed August 20, 1928. Serial No. 300,696.

This invention relates to improvements in advertising display devices.

It is the object of the invention to provide a novel and improved advertising device for utilizing the light in the sky, or other available light, in the brilliant illumination of an advertising display in colors if desired.

More specifically, it is my purpose to provide for color effects which have heretofore been impracticable; to provide for a quick and easy change of advertising display and color; to provide a novel and improved mounting for the advertising display adapted to protect it from injury; to provide a novel and improved mirror mounting adapted to increase greatly the life of a mirror used in a device of this character; to provide a color medium which will resist fading indefinitely when exposed to the full sunlight; and to provide a novel and improved mounting to maintain the entire apparatus with all its parts in their proper relative positions.

In the drawings—

Figure 1 is a front elevation of the device embodying this invention;

Figure 2 is a plan view of the device shown in Fig. 1;

Figure 3 is a rear elevation of the device;

Figure 4 is an end elevation thereof;

Figure 5 is a section on an enlarged scale transversely through the device shown in Figs. 1 to 4 inclusive;

Figure 6 is a fragmentary detail in perspective showing the assembly of the specific device of Figs. 1 to 5;

Figure 7 is a fragmentary detail showing a modification of the assembly illustrated in Fig. 6;

Figure 8 is a view similar to Figs. 6 and 7 illustrating a further modification.

Like parts are identified by similar reference numerals throughout the several views.

The mechanical construction of the frame or case in which the parts are mounted is such as to provide a sturdy mounting which is easily attached to a motor vehicle or other support while giving maximum protection to the glass partition and permitting of the change of an advertising display medium either as to substance or color, with very little difficulty.

In the preferred form of the invention, the case comprises a back 10 having flaring end walls 11 and a top 12, which is provided with a very large central opening at 13 about which the material comprising the top is preferably of double thickness to provide strength. Spaced from opening 13 at all sides is a peripherally extending marginal flange 15 within which the glass for supporting and carrying the display is receivable. A visor preferably projects forwardly at 16 to increase the effectiveness of the display by darkening the interior of the case above described.

The case is maintained erect upon a suitable support such as the top of a commercial motor vehicle, by means of an easel which may comprise simply a horizontal member 17 and a vertical support 18, both of which are connected to the back 10, as best shown in Figure 5. The horizontal member may be suitably apertured, as at 19 (Figs. 2 and 3), to receive attaching screws.

The back 10 is preferably at an angle of approximately 45° with reference both to the horizontal and to the vertical. It is thereby adapted to provide a support and backing for the reflecting mirror 20. The back is provided at 21 with a number of prongs or fingers which extend about the lower edge of the mirror to hold it in position.

It has been found by experience that where a device of this character is exposed to the weather as when mounted on the top of a commercial vehicle moisture is apt to accumulate on the back of mirror 20 with the result that the reflecting backing of the mirror becomes destroyed. I have discovered, however, that this difficulty can be overcome by the construction herein disclosed in which the entire peripheral margin of the mirror is encompassed in channel-shaped rubber members 25 which rest against the back wall 20 of the device and thus space the mirror therefrom. The space between the mirror and the back wall is vented and drained through the openings 26 and 27. Incidentally the channel-shaped pieces of rubber tend to absorb shocks to which the mirror is subject and this desirable result takes the place of the support which is otherwise given to the mirror if the mirror rests directly upon the back wall 10 of the cabinet. It is found that devices in which the mirror is supported as herein disclosed, will last indefinitely without tarnishing, scratching, or breakage of the mirror.

In order to render the mirror useful as an advertising display medium, it is necessary to provide a light diffusing means and a stencil of some character which will only permit the passage of such brightly colored light as is required to make the display effective. In the simplest form of a device of this character, the stencil may comprise paint applied to the under surface of a sheet of diffusing glass, of the type commercially known as moss glass, or its equivalent. The letters must be applied reversely, however, since they are seen inverted in the mirror 20 and, furthermore, it is found that the paint becomes scratched in practice due to the necessity of wiping dust from the interior of the viewing cabinet. It is preferred therefore to provide as a basis for the display a sheet 30 which is preferably of clear or transparent glass and which is supported above the opening 13 in the top 12 of the viewing cabinet by means of strips of channel rubber 25 identical with those previously described. The glass is of such a size that the glass with the channel rubber applied to its margins is just receivable between the upstanding flanges 15.

If desired, the stencil may be formed by paint which is preferably black and entirely opaque and is applied at 31 to the upper surface of glass 30 in such a way as to block out clear spaces at 32 in the form of letters. The sheet of light-diffusing or moss glass 33 is then applied to rest on the rubber channels 25 and the assembly is maintained by means of the skeleton cover 37 which bears marginally upon moss glass 33 and embraces flange 15, as best shown in Figure 6. The cover may be bolted to the cabinet in the manner shown in Figures 2 and 5.

The above arrangement which is illustrated in detail in Figure 6 is very satisfactory where a single color is desired and where no changes either in color or substance of the display are necessary. The moss glass 33 may be procured in any desired color and the light of the sky or the direct sunlight shining thereon becomes brilliantly visible in mirror 20 to an observer standing in front of the cabinet who sees only such portions of the highly illuminated diffusing screen 33 as are exposed in the unblocked openings 32 of the stencil plate 30.

In order to facilitate changes in the character of the advertising, the constructions shown in Figures 7 and 8 are preferred. In this construction, the glass plate 30 is entirely clear and devoid of any stencil markings. The moss glass 33 instead of being colored, may be white or even transparent to any degree which is permissible within the requirements as to the diffusion of the light.

The stencil in its construction is painted upon a separate sheet of glass 40 which is slightly smaller than the glass pane 30 so that it may rest between the flanges of the marginal channel 25. The entire display is colored through the very simple expedient of interposing between the stencil glass 40 and the clear glass 30 one or more sheets of highly transparent colored material preferably of some cellulose type such as the paper commercially known as cellophane. It will be obvious that it is possible either to cover the entire display with one sheet of paper to give a single color effect or else to use separate pieces of paper of different colors in order that parts of the display may differ in color from other parts.

The use of colored cellophane solves a practical problem in devices of this kind, since it has been found that no dye suitable for printing purposes will resist fading when exposed to the sun, whereas colored cellophane may be exposed to the sun indefinitely without fading.

Where paint is used for a stencil screen and a cellulose product is used for the color screen, care should be taken to have the paint on the opposite side of one of the glasses from the color screen since the cellophane or the like will adhere to and destroy a coating of the type of paint used for marking on glass.

Cellophane, however, has a rather high response to temperature and moisture conditions and it is impracticable to use any ordinary means of holding it in place lest it become wrinkled or torn through expansion or contraction. This problem is solved in the present device by laying the cellophane flat between the panes of glass 30 and 40 without anchoring it in any way other than by the pressure of the upper glass thereon. It is found that the desired color effects are produced in this manner without wrinkling, crackling or distortion of the cellophane paper and without fading such as was experienced in attempts to use other color screens of a transparent nature.

Celluloid and other transparent sheets which may be colored are also usable, and are regarded for many purposes as the equivalent of cellophane although the paper is somewhat cheaper.

It will likewise be obvious that the stencil need not be wholly opaque but may be cut from some transparent colored paper or other screen to give a multiplicity of desirable color effects. In Figure 8 I have illustrated the use of two sheets of colored cellophane, one of which is continuous, as shown at 41, and the other of which is cut to comprise a stencil. By way of an example, the stencil sheet 42 has been shaded to represent the color blue, while the continuous color sheet 41 has been shaded to indicate the fact that it is yellow.

It will be obvious that this arrangement will result in the display of yellow letters or other advertising symbols where the light diffused by screen 33 passes solely through sheet 41. The background, however, will be green due to the effect produced by the combined action of both colors of sheets 41 and 42 upon the light. It will be obvious that still different color effects may be produced by cutting out the letters or symbols from cellophane of one color and inserting them into the open areas in the cellophane stencil sheet of a different color. The joint between the background areas and the letters or symbols may be covered with narrow strips of black paper and the whole may be held in place between two sheets of glass, as herein disclosed, thus eliminating any necessity for relying upon adhesive, which cannot be used with cellophane.

The sheet of moss glass resting on the rubber channel strips makes a water tight joint which protects the color screen.

It will be understood that in referring to cellophane it is intended to designate generically the thin, transparent, cellulose, paper like product which is now widely available in various colors and it is not desired to limit this invention to the use of any specific product or the product of any specific manufacturer. It is even possible for certain purposes to use waxed or oiled paper where a high degree of transparency is not required, and, as above indicated, celluloid is also usable interchangeably with cellophane for most purposes.

I claim:

1. In a device of the character described, the combination with a supporting frame, of a glass fitted therein and provided about its margins with a peripherally extending resilient channel seated in said frame, a diffusing glass resting upon said channel and spaced by a portion thereof from said first glass, stencil means between said glasses and protected thereby, and means for securing said diffusing glass and said first mentioned glass in place upon said frame.

2. In a device of the character described, the combination with a supporting frame, of a glass fitted therein and provided about its margins with a peripherally extending resilient channel seated in said frame, a diffusing glass resting upon said channel, and means for securing said diffusing glass and said first mentioned glass in place upon said frame, together with a stencil screen mounted upon said first mentioned glass within the peripherally extending channel and beneath said diffusing glass.

3. In a device of the character described, the combination with a supporting frame, of a glass fitted therein and provided about its margins with a peripherally extending resilient channel seated in said frame, a diffusing glass resting upon said channel, and means for securing said diffusing glass and said first mentioned glass in place upon said frame, together with a stencil screen mounted upon said first mentioned glass within the peripherally extending channel and beneath said diffusing glass, and a sheet of colored cellophane interposed between said stencil screen and said first mentioned glass.

4. In a device of the character described, the combination with a viewing cabinet providing an inclined mirror and an apertured top provided with an encircling flange, of a transparent support upon said flange, a sheet of colored paper mounted on said support and a light transmitting pressure plate resting upon said paper and adapted to maintain its position upon said support, together with means for maintaining said pressure plate and support assembled upon said cover in registry with the aperture thereof, and means for blocking out specific areas of said paper for light transmission therethrough in a color determined by the color of said paper.

5. In a device of the character described, the combination with a viewing cabinet provided with an inclined mirror, and an apertured top of a transparent support covering the aperture of said top, a sheet of colored cellophane resting upon said support, stencil means blocking out predetermined areas of said cellophane for transmission of light of a predetermined color, and a clamping device holding said stencil means and paper to said support.

6. In a device of the character described, the combination of a cabinet provided with an inclined mirror, an open front and an apertured top, of a glass plate fitted to said top to cover the aperture therein, a rubber channel about the periphery of said plate interposed between the margins of the plate and the adjacent marginal portions of the top, a stencil screen movably disposed upon said plate between said rubber channel members, a diffusing glass resting upon said channel members, and means for securing said glass screen and plate in assembled relation upon the top of said cabinet.

7. In a device of the character described, the combination of a cabinet provided with an inclined mirror, an open front and an apertured top, of a glass plate fitted to said top to cover the aperture therein, a rubber channel about the periphery of said plate interposed between the margins of the plate and the adjacent marginal portions of the top, a stencil screen movably disposed upon said plate between said rubber channel members, a diffusing glass resting upon said channel members, and means for securing said glass screen and plate in assembled relation upon the top of said cabinet, together with a sheet of substantially transparent colored paper interposed between said screen and plate and adapted to be positioned by compression therebetween.

8. In a device of the character described, the combination with a viewing chamber having an apertured back, of a mirror resting in said chamber on an incline in spaced relation to said back, and provided with supporting means exposing the back of the mirror to air circulating through the aperture of said back whereby to prevent accumulations of moisture on the reflecting surface thereof.

9. In a device of the character described, the combination with a viewing cabinet provided with an inclined support and a mirror in an inclined position upon said support, of a rubber channel member fitted about the periphery of said mirror and spacing said mirror from said support, the space behind said mirror being ventilated.

10. In a device of the character described, a viewing chamber comprising an inclined back, flaring ends, an apertured top provided with a visor, and an easel connected with said back and provided with means for the support of said viewing chamber in an erect position and for the attachment thereof to a mounting.

11. In a device of the character described, the combination with an inclined mirror, of a viewing chamber providing a support for the mirror and having an apertured top of which the material adjacent the aperture is folded back upon itself at the margin of the aperture and is thence bent upwardly to provide a flange spaced from said aperture, light diffusing and stencil means mounted upon said top beneath said flange, and a skeleton cover applied to said top about said flange and adapted to secure said means in place thereon.

12. In a device of the character described, the combination with an inclined mirror, of a viewing chamber providing a support for the mirror and having an apertured top of which the material adjacent the aperture is folded back upon itself at the margin of the aperture and is thence bent upwardly to provide a flange spaced from said aperture, light diffusing and stencil means mounted upon said top beneath said flange, and a skeleton cover applied to said top about said flange and adapted to secure said means in place thereon, said means comprising a glass plate, a color sheet mounted thereon, a stencil screen mounted upon said color plate and a diffusing glass upon said color screen.

13. In a device of the character described, the combination with a viewing chamber providing an inclined mirror and an apertured top, of a plurality of sheets of colored cellophane in face contact and formed to provide areas defined in color and of a predetermined form to represent desired characters, light transmitting sheets in pressure engagement with said sheets of cellophane for the mounting thereof, and means securing said last mentioned sheets upon said top.

14. In a device of the character described, the combination with a viewing chamber providing an inclined mirror and an apertured top, of a plurality of sheets of differently colored cellophane of such form and in such relation as to define predetermined colored areas in the form of predetermined symbols on a colored background, together with glass plates in pressure engagement upon said sheets of cellophane whereby to maintain the position thereof, and means for mounting said plates with the interposed sheets of cellophane upon the top of said cabinet in registry with the aperture therein.

15. In a device of the character described, the combination with a viewing chamber providing an inclined mirror and an apertured top, of a plurality of sheets of differently colored cellophane of such form and in such relation as to define predetermined colored areas in the form of predetermined symbols on a colored background, together with glass plates in pressure engagement upon said sheets of cellophane, whereby to maintain the position thereof, and means for mounting said plates with the interposed sheets of cellophane upon the top of said cabinet in registry with the aperture therein, said means comprising an upstanding flange spaced from said aperture and a skeleton cover adapted to secure said plates within said flange and provided with means of attachment to said top.

16. In a device of the character described, the combination with a supporting frame, of a glass fitted therein and provided about its margins with a peripherally extending resilient channel seated in the frame, a diffusing glass resting upon said channel and spaced by a portion thereof from said first glass, a sheet of material in the space within said channel portion and between said glasses and adapted to modify the effect of light passing between said glasses.

HARRY J. ZIEMAN.